Sept. 15, 1959
N. P. PEET
2,904,575
PRODUCTION OF METHANOL
Filed Nov. 21, 1957
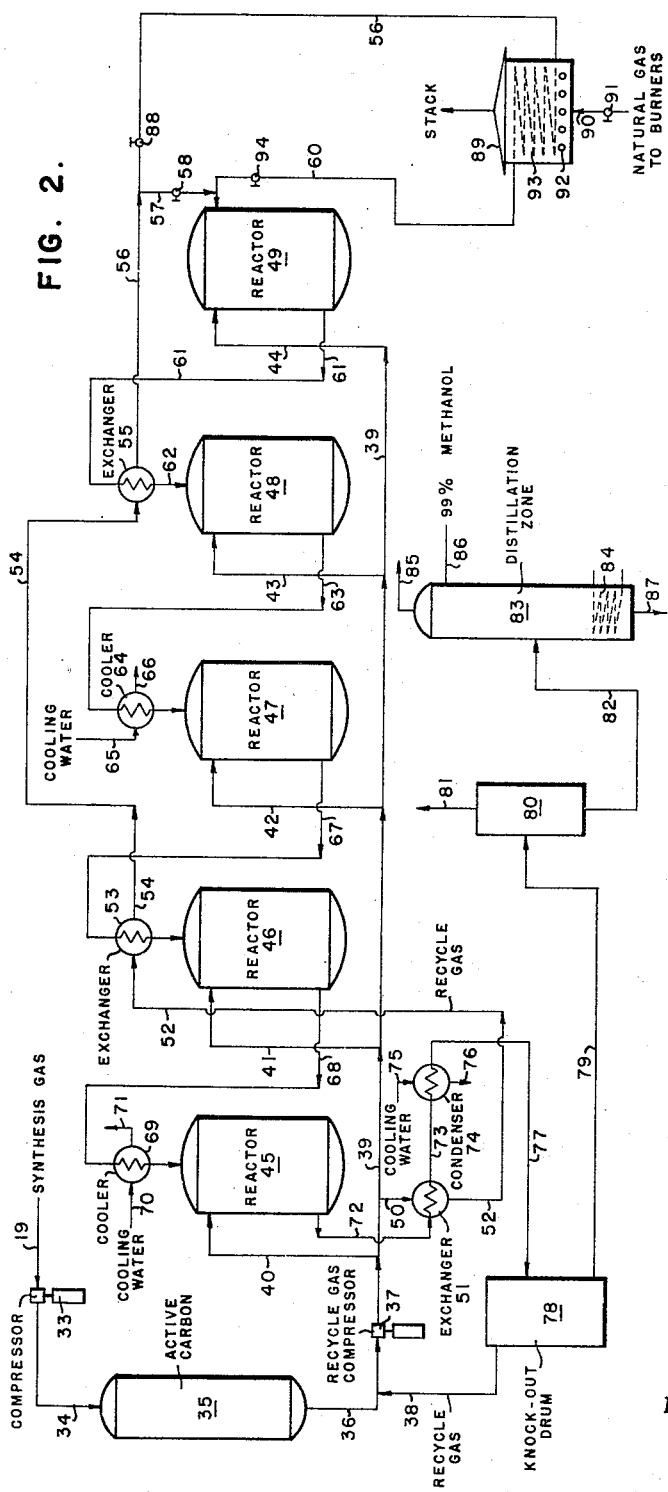
INVENTOR.
NICK P. PEET,
BY
ATTORNEY.

United States Patent Office 2,904,575
Patented Sept. 15, 1959

2,904,575

PRODUCTION OF METHANOL

Nick P. Peet, Baytown, Tex., assignor, by mesne assignments, to Esso Research and Engineering Company, Elizabeth, N.J., a corporation of Delaware Application November 21, 1957, Serial No. 697,829

13 Claims. (Cl. 260—449.5)

The present invention is directed to the production of methanol. More particularly, the invention is concerned with the production of methanol from methane. In its more specific aspects the invention is concerned with a method for producing methanol in a plurality of reaction zones.

The present invention may be briefly described as a method for producing methanol from methane in which a methane feed stream is divided into a first portion and a second portion. The first portion is contacted in admixture with steam and carbon dioxide obtained in a later step of the invention at an elevated temperature in a conversion zone with a catalyst to produce synthesis gas. The second portion of the methane feed stream is burned in the conversion zone to provide the elevated temperature and to form a combustion gas containing substantial amounts of carbon dioxide. The combustion gas is cooled with water to generate steam and reduce the temperature of the combustion gas. Carbon dioxide is recovered from the cooled combustion gas, and the steam and recovered carbon dioxide are admixed with the first portion. The synthesis gas comprising carbon monoxide and hydrogen is recovered from the contacted mixture and passed in admixture with recycle gas in parallel, while recycle gas and product flows serially, through a plurality of reaction zones, each containing a conversion catalyst, at suitable reaction conditions to produce methanol and to provide from about 5 to about 6 percent conversion. Heat is removed from the reaction externally and between each of the reaction zones. By virtue of removing heat externally and providing the specific degree of conversion the amount of recycle gas is substantially diminished over that heretofore required and a product is formed containing substantial amounts of methanol with the sole feed to the operation being methane. While methane is a preferred feed, other gases such as ethane and propane may be used.

The temperature at which the first portion is contacted with the catalyst to produce synthesis gas may suitably range between about 1100° and 1850° F. with satisfactory operations obtained at a temperature of about 1500° F. Pressures for the production of synthesis gas may range from about 0 to about 300 pounds per square inch gauge, with suitable operations conducted at a pressure of about 150 pounds per square inch gauge.

The temperatures for the production of methanol may range from about 550° to about 750° F., with satisfactory operations conducted at about 650° F.

Pressures for the synthesis of methanol may range from about 2000 to about 6000 pounds per square inch gauge, with desirable results produced at a reactor outlet pressure of 4500 pounds per square inch gauge at a reactor temperature of 630° F. at the inlet and 715° F. at the outlet.

The catalyst employed in the production of the synthesis gas is suitably a nickel catalyst, such as reduced nickel oxide, nickel-thoria magnesia, nickel-alumina-magnesia, nickel-magnesia, nickel on carbon, or nickel on alumina. Other suitable catalysts may include cobalt molybdate supported on alumina, a group VIII metal or metal oxide on a suitable support, nickel and iron on a support or carrier, and the like.

The catalyst employed in the production of methanol may suitably be zinc oxide-chromia, but may be copper promoted with cerium oxide and containing zinc oxide.

The present invention is suitably conducted to produce a synthesis gas containing approximately two parts of hydrogen and one part of carbon monoxide, with about 50 to about 75 percent of the combustion gas being cooled with water to generate steam and reduce the temperature of the gas. The synthesis gas is charged to the methanol conversion catalyst in a ratio of about 2 to 3 parts of recycle gas per part of charge gas. In other words, the synthesis gas plus recycle gas will total approximately 4 parts.

In the production of methanol from the synthesis gas it is desirable to provide at least 4 reaction zones with 5 being a preferred number. It is further desirable to maintain the temperature in each reaction zone substantially within the range between about 630° and 715° F. By providing the stated number of reaction zones and providing a conversion from about 5 to about 6 percent with a total conversion per pass ranging from about 25 to about 30 percent, the amount of recycle gas is substantially diminished over that heretofore required.

The present invention will be further illustrated by reference to the drawing in which:

Fig. 1 is a flow sheet of the synthesis step of the present invention; and

Fig. 2 is in the form of a flow sheet of the methanol step of the present invention, Fig. 2 being a continuation of Fig. 1 and the combined operations illustrating a preferred mode.

Referring now to the drawing, and particularly to Fig. 1, numeral 11 designates a charge line by way of which a methane-containing feed stream such as natural gas is introduced into the system from a source not shown. The methane feed stream is divided into two portions, with one portion being introduced into a conversion zone 12 arranged in a furnace 13, while the second portion is fed by way of line 14 into line 15 for admixture with air for charging to furnace 13 to be burned in burners 16 to raise the temperature of the methane introduced into reaction zone 12, which is in the form of a coil containing a suitable synthesis gas catalyst of the type illustrated. By virtue of the burning or combustion operation in zone 13, a synthesis gas having a composition as shown in Table I may be formed.

TABLE I

Synthesis gas

| | Percent |
|---|---|
| CO | 25.3 |
| CO$_2$ | 5.7 |
| H$_2$ | 67.5 |
| H$_2$O | 1.3 |
| CH$_4$ | 0.1 |
| N$_2$ | 0.1 |

This synthesis gas is recovered from zone 12 by line 17 and cooled in cooler 18 for introduction into the methanol synthesis operation by way of line 19, which will be described further hereinafter.

The flue gas issues from zone 13 by way of line 20 with from about 50 to 75 percent of the flue gas being recovered by way of line 21 while the remainder is discharged by way of line 22 into a suitable stack for venting to the atmosphere, the stack not being shown.

The flue gas then passes through a suitable boiler 23 into which water is admitted by way of line 24 for generation of steam which is withdrawn by line 25 and which is recycled to line 11 for charging with the first portion of the methane to reaction zone 12.

The cooled flue gas is then introduced by line 26 into a recovery unit 27 which suitably may be an absorber for carbon dioxide such as a tower with internal baffling equipment or other suitable gas-liquid contacting means such as bell cap trays and the like. Introduced into the top of absorption zone 27 is a suitable absorbent, such as monoethanolamine, by way of line 28, but which may be any other suitable absorbents for carbon dioxide.

The unabsorbed flue gas is discharged from absorption zone 27 by line 29, while the enriched solution containing absorbed carbon dioxide is withdrawn from zone 27 by line 30 into a stripping zone 31, where heat is applied to drive the absorbed carbon dioxide from the monoethanolamine. The carbon dioxide is recovered by line 32 and discharged into line 11 to form the feed admixture to the reaction zone 12.

By virtue of an operation such as described in Fig. 1, the synthesis gas is generated solely from methane and air in a suitable combined furnace-conversion zone.

The synthesis gas in line 19 (Fig. 2) is suitably compressed in a compressor 33 and then discharged by way of line 34 into a tower 35 containing a bed of active carbon for removal of carbonyls. The scrubbed synthesis gas discharges from zone 35 by way of line 36 into a recycle gas compressor 37 in admixture with recycle gas introduced by line 38. The amount of recycle gas is approximately 2 to 3 parts of recycle gas per part of fresh feed. The total mixture then passes by way of line 39 and is introduced in parallel by way of lines 40, 41, 42, 43 and 44 into a plurality of reaction zones 45, 46, 47, 48 and 49, each provided with a bed of a methanol synthesis catalyst such as for example zinc oxide-chromia. A portion of the total feed mixture is then passed by way of line 50 into a heat exchanger 51 and the gas issues from heat exchanger 51 by way of line 52 and then passes into an exchanger 53 and thence by line 54 into another heat exchanger 55 and finally the recycle gas mixture is introduced by line 56 and branch line 57, controlled by valve 58, into line 60 for introduction into reaction zone 49, the recycle gas and product passing in series by way of line 61 from zone 49 through heat exchanger 55 and by line 62 into reaction zone 48 and thence by line 63 through a cooler 64 into reaction zone 47. The cooler 64 is suitably cooled with a cooling medium such as water introduced by line 65 and withdrawn by line 66. The recycle gas and product from reaction zone 47 issues therefrom by way of line 67 and passes in heat exchange with the gas introduced by line 52 and thence into reaction zone 46, recycle gas and product being discharged from reaction zone 46 by way of line 68 and passing through cooler 69 into reaction zone 45, cooler 69 being cooled with water introduced by line 70 and discharged by line 71. The gas and product finally issues from reaction zone 45 by line 72 and passes in heat exchange with the gas introduced by line 50 and is discharged by line 73 into cooler 74 into which water is introduced by line 75 and withdrawn by line 76. The cooled gas and product discharges from cooler 74 by line 77 into a knockout drum 78 with the recycle gas being withdrawn therefrom by line 38 and the cooled liquid containing the product being withdrawn by line 79 and introduced into a drum 80 wherein separation is made between the gaseous and liquid products, with the gases being withdrawn by line 81 and the product being withdrawn by line 82 for introduction into a suitable fractional distillation tower 83 provided with all auxiliary equipment including cooling and condensing means and suitable reboilers and the like. For purposes of illustration only, the reboiler is shown as internal steam coil 84 for adjusting temperature and pressures in fractional distillation zone 83. Light products are withdrawn from fractional distillation zone 83 by line 85 with 99%+ purity methanol being recovered by line 86 and heavy fractions by line 87.

During start-up operations it may be desirable to open valve 88 in line 56 and to allow a portion of the recycle gas to be introduced into a furnace 89 provided with line 90 controlled by valve 91 by way of which natural gas is introduced to burners 92 for support of a combustion operation, the recycle gas passing through coil 93 and being heated to a suitable temperature prior to passage through line 60 on opening valve 94 into reaction zone 49 as has been described.

The operation described with respect to Fig. 1 produces a synthesis gas containing approximately 2 parts of hydrogen to 1 part of carbon monoxide. Approximately ½ to ¾ of the flue gas from the combustion operation is cooled, compressed and processed to extract carbon dioxide which is then used to supply the carbon dioxide requirements for the synthesis gas operation.

In the synthesis of methanol a conversion of about 5 to about 6 percent per stage gives a total conversion per pass from about 25 to about 30 percent. By utilizing the reactants in the manner set forth in the drawing, it is possible to obtain substantially increased conversions. In a conversion operation where internal heat exchange is employed to transfer heat of reaction from a catalyst bed to the incoming feed, conversions of about 10 to about 15 percent are obtained, with the amount of recycle gas resulting in total feed to fresh feed ratios as high as 9:1.

In contrast to operations obtainable heretofore, in the present invention a total conversion per pass of from about 25 to about 30 percent is obtained with a conversion of about 5 to 6 percent in each stage. The amount of recycle gas is diminished to the extent that a total feed to fresh feed ratio of 3–4:1 is employed. In other words, the practice of the present invention allows the production of methanol from methane only as the feed stock, gives improved results in diminishing the amount of recycle gas required, and increases conversion.

The present invention may be further illustrated by the following examples:

EXAMPLE I

A stream of natural gas amounting to 12.2 million cubic feet/day is divided into a first portion of 7.5 million cubic feet/day which is charged to a conversion reactor and a second portion of 4.7 million cubic feet/day which is burned in a furnace providing heat for conversion of the afore-mentioned first portion. The heat released from combustion of the 4.7 million cubic feet/day portion is in balance with that required for conversion of the 7.5 million cubic feet/day in the reactor.

Natural gas suitable for this operation may have a typical analysis as follows:

| | | |
|---|---|---|
| $CH_4$ | mol percent | 94.57 |
| $C_2H_6$ | do | 4.14 |
| $C_3H_8$ | do | 0.75 |
| $C_4H_{10}$ | do | 0.04 |
| $CO_2$ | do | 0.30 |
| Air | do | 0.20 |
| $H_2S$ | p.p.m./w | 0.3 |

A portion of the flue gas from the reactor furnace is passed through a steam generating system from which is produced 800,000 lbs./day of steam. The cooled flue gas from the steam generating plant is passed to a $CO_2$ recovery system from which 2.5 million cubic feet/day of $CO_2$ is recovered from the flue gas.

The total feed gas mixture to the reactor comprising 7.5 million cubic feet/day of natural gas, 2.5 million cubic feet/day of $CO_2$, and 639,000 lbs./day of steam (the steam comprising approximately 80% of that generated by the flue gases cooled for recovery of $CO_2$). This admixture is passed at 1000 v./v./hr. (based on outlet $H_2+CO$) through furnace tubes packed with a nickel catalyst such as the Girdler type G–29 catalyst which contains 27% nickel on a suitable support. The effluent from the reactor at 20 p.s.i.g. and 1550° F.

amounting to 38.8 million cubic feet/day comprises a mixture having the following approximate composition:

| | Percent |
|---|---|
| Hydrogen | 58.2 |
| CO | 21.8 |
| $CO_2$ | 4.9 |
| $H_2O$ | 14.9 |

The above mixture is passed through a scrubber-cooler whereupon it is cooled to a temperature of approximately 100° F. A gaseous mixture is recovered from the scrubber-cooler having the following composition:

| | Percent |
|---|---|
| $H_2$ | 67.5 |
| CO | 25.3 |
| $CO_2$ | 5.7 |
| $H_2O$ | 1.3 |

The aboxe mixture, which is at 15 p.s.i.g., is then compressed and used for conversion to methanol.

EXAMPLE II

A total feed gas of 125,000,000 cubic feet/day, comprising a blend of 33,000,000 cubic feet/day of fresh feed gas and 92,000,000 cubic feet/day of recycle gas is charged to five reactors in series. The composition of the fresh feed and of the recycle gas feed, as well as the blend, is shown in the following table.

| | Fresh Feed | Recycle Feed | Blend |
|---|---|---|---|
| Hydrogen, Mol Percent | 68.5 | 65.3 | 66.1 |
| CO, Mol Percent | 25.5 | 24.3 | 24.6 |
| $CO_2$, Mol Percent | 5.8 | 5.5 | 5.6 |

The aforementioned blend is charged to the first reactor at a pressure of 4850 p.s.i.g. and a temperature of 630° F. A temperature rise of 85° F. occurs in the first reactor resulting in an outlet temperature of 750° F. The entire reactor product is passed through heat exchange means whereupon the temperature is reduced to 630° F. for introduction into the second reactor. A similar temperature rise occurs in each of the subsequent reactors and cooling is required between each of the reactors to remove the exothermic heat of reaction. The reactors contain zinc oxide-chromia catalyst and are charged at a rate of 15,250 gaseous v./v./hr.

The total product issuing from the last reactor at 4550 p.s.i.g. is passed to a separator after being cooled to 120° F. A gaseous stream comprising 3,500,000 cubic feet/day of bleed gas and 92,000,000 cubic feet/day of recycle gas is removed from the separator and a product comprising 2820 barrels/day of methanol containing 1.5% dimethylether and 250 barrels/day of water is recovered as a bottoms product. This product is subjected to conventional distillation to recover 2770 barrels/day of methyl alcohol of 99.85% purity.

The present invention is of considerable importance and utility in that methanol is useful as a solvent and may be used in preparing high octane number motor fuels by blending the methanol with gasoline and other volatile components.

While the invention has been described and illustrated by reference to use of methane as the feed, it will be preferred to employ natural gas as the feed. Natural gas as produced usually comprises a major amount of methane and minor amounts of ethane, propane and butane. Accordingly, it is contemplated that mixtures of these several hydrocarbons having 1 to 4 carbon atoms in the molecule may be used or the hydrocarbons in a substantially purified form may comprise the feed stock.

This application contains common subject matter to Serial No. 697,982, filed November 21, 1957, for Nick P. Peet, and entitled "Production of Synthesis Gas."

The nature and objects of the present invention having been completely described and illustrated, what I wish to claim as new and useful and secure by Letters Patent is:

1. A method for producing methanol which comprises passing a first portion of an admixture of synthesis gas comprising carbon monoxide and hydrogen with recycle gas in parallel through a plurality of serially interconnected reaction zones each containing a bed of conversion catalyst at suitable reaction conditions to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

2. A method for producing methanol which comprises passing a first portion of an admixture of synthesis gas comprising carbon monoxide and hydrogen with recycle gas in parallel through a plurality of serially interconnected reaction zones each containing a bed of conversion catalyst at suitable reaction conditions including a temperature within the range from about 630° to about 715° F. and at a pressure within the range from about 2,000 to about 6,000 pounds per square inch gauge, to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

3. A method for producing methanol which comprises passing a first portion of an admixture of synthesis gas comprising carbon monoxide and hydrogen with recycle gas in parallel through a plurality of serially interconnected reaction zones each containing a bed of zinc oxide-chromia conversion catalyst at suitable reaction conditions to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

4. A method for producing methanol which comprises passing a first portion of an admixture of synthesis gas comprising carbon monoxide and hydrogen with recycle gas in a ratio of 3 parts of admixture per part of recycle gas in parallel through a plurality of serially interconnected reaction zones each containing a bed of conversion catalyst at suitable reaction conditions to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

5. A method for producing methanol which comprises passing a first portion of an admixture of synthesis gas comprising carbon monoxide and hydrogen with recycle gas in parallel through a plurality of serially interconnected reaction zones each containing a bed of conversion catalyst at suitable reaction conditions to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products to maintain the temperature in each reaction zone substantially constant and equal, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

6. A method in accordance with claim 5 in which five reaction zones are employed and the temperature in said zones is within the range between about 630° and 715° F. and the pressure in each zone is within the range between about 2000 and about 6000 pounds per square inch gauge.

7. A method for producing methanol which comprises passing a first portion of an admixture of synthesis gas comprising carbon monoxide and hydrogen with recycle gas in parallel through a plurality of serially interconnected reaction zones each containing a bed of zinc oxide-chromia conversion catalyst at suitable reaction conditions including a temperature within the range from about 630° to about 715° F. and at a pressure within the range from about 2,000 to about 6,000 pounds per square inch gauge to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

8. A method for producing methanol which comprises the steps of dividing a natural gas feed stream into a first portion and a second portion, contacting the first portion in admixture with steam and carbon dioxide obtained in a later step at an elevated temperature in a conversion zone with a catalyst to produce synthesis gas, burning the second portion to provide said elevated temperature and to form a combustion gas containing substantial amounts of carbon dioxide, cooling the combustion gas with water to generate steam and reduce the temperature of the combustion gas, recovering carbon dioxide from the cooled combustion gas, admixing the steam and recovered carbon dioxide with the first portion, recovering said synthesis gas comprising carbon monoxide and hydrogen from the contacted admixture, passing a first portion of an admixture of said recovered synthesis gas comprising carbon monoxide and hydrogen with recycle gas in parallel through a plurality of serially interconnected reaction zones each containing a bed of conversion catalyst at suitable reaction conditions to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

9. A method for producing methanol which comprises the steps of dividing a natural gas feed stream into a first portion and a second portion, contacting the first portion in admixture with steam and carbon dioxide obtained in a later step at an elevated temperature within the range between about 1100° and 1850° F. in a conversion zone with a catalyst to produce synthesis gas, burning the second portion to provide said elevated temperature and to form a combustion gas containing substantial amounts of carbon dioxide, cooling the combustion gas with water to generate steam and reduce the temperature of the combustion gas, recovering carbon dioxide from the cooled combustion gas, admixing the steam and recovered carbon dioxide with the first portion, recovering said synthesis gas comprising carbon monoxide and hydrogen from the contacted admixture, passing a first portion of an admixture of said recovered synthesis gas comprising carbon monoxide and hydrogen with recycle gas in parallel through a plurality of serially interconnected reaction zones each containing a bed of conversion catalyst at suitable reaction conditions including a temperature within the range from about 630° to about 715° F. and at a pressure within the range from about 2,000 to about 6,000 pounds per square inch gauge to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

10. A method for producing methanol which comprises the steps of dividing a methane-containing feed stream into a first portion and a second portion, contacting the first portion in admixture with steam and carbon dioxide obtained in a later step at an elevated temperature in a conversion zone with a nickel catalyst to produce synthesis gas, burning the second portion to provide said elevated temperature and to form a combustion gas containing substantial amounts of carbon dioxide, cooling the combustion gas with water to generate steam and reduce the temperature of the combustion gas, recovering carbon dioxide from the cooled combustion gas, admixing the steam and recovered carbon dioxide with the first portion, recovering said synthesis gas comprising carbon monoxide and hydrogen from the contacted admixture, passing a first portion of an admixture of said recovered synthesis gas comprising carbon monoxide and hydrogen with recycle gas in parallel through a plurality of serially interconnected reaction zones each containing a bed of zinc oxide-chromia conversion catalyst at suitable reaction conditions to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

11. A method for producing methanol which comprises the steps of dividing a methane-containing feed stream into a first portion and a second portion, contacting the first portion in admixture with steam and carbon dioxide obtained in a later step at an elevated temperature in a conversion zone with a catalyst to produce synthesis gas containing approximately two parts of hydrogen to one part of carbon monoxide, burning the second portion to provide said elevated temperature and to form a combustion gas containing substantial amounts of carbon dioxide, cooling from about 50 percent to about 75 percent of the combustion gas with water to generate steam and reduce the temperature of the gas, recovering carbon dioxide from the cooled combustion gas, admixing the steam and recovered carbon dioxide with the first portion, recovering said synthesis gas from the contacted admixture, passing a first portion of an admixture of said recovered synthesis gas comprising carbon monoxide and hydrogen with recycle gas in a ratio of 3 parts of admixture per part of recycle gas in parallel through a plurality of serially interconnected reaction zones each containing a bed of conversion catalyst at suitable reaction conditions to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

12. A method for producing methanol which comprises the steps of dividing a hydrocarbon feed stream having 1 to 4 carbon atoms in the molecule into a first portion and a second portion, contacting the first portion in admixture with steam and carbon dioxide obtained in a later step at an elevated temperature in a conversion zone with a catalyst to produce synthesis gas, burning the second portion in said conversion zone to provide said elevated temperature and to form a combustion gas containing substantial amounts of carbon dioxide, cooling the combustion gas with water to generate steam and reduce the temperature of the combustion gas, recovering carbon dioxide from the cooled combustion gas, admixing the steam and recovered carbon dioxide with the first portion, recovering synthesis gas comprising carbon monoxide and hydrogen from the contacted admixture, passing a first portion of an admixture of said recovered synthesis gas comprising carbon monoxide and hydrogen with recycle gas in parallel through a plurality of serially interconnected reaction zones each containing a bed of conversion catalyst at suitable reaction conditions to provide a conversion from about 5 to about 6 percent in each zone and to produce in each zone a product containing methanol and recycle gas, the total product from each reaction zone passing in series to the next preceding reaction zone, removing heat of reaction externally and between each of said reaction zones from each of said products to maintain the temperature in each reaction zone substantially constant and equal, introducing a second portion of said admixture into the last of said reaction zones, and recovering from the first of said reaction zones the total products from said plurality of reaction zones whereby the amount of recycle gas is substantially diminished over that heretofore required and increased conversions are obtained.

13. A method in accordance with claim 12 in which five reaction zones are provided and the total conversion per pass is from about 25 percent to about 30 percent.

References Cited in the file of this patent

UNITED STATES PATENTS

| | | |
|---|---|---|
| 2,281,228 | Brown | Apr. 28, 1942 |
| 2,585,981 | Watson | Feb. 19, 1952 |
| 2,621,202 | Peukert et al. | Dec. 9, 1952 |